United States Patent [19]

Spencer

[11] 4,382,483
[45] May 10, 1983

[54] LOAD-RESPONSIVE STEERING CONTROL VALVE

[75] Inventor: Joseph C. Spencer, Dubuque, Iowa

[73] Assignee: Deere & Company, Moline, Ill.

[21] Appl. No.: 252,649

[22] Filed: Apr. 9, 1981

[51] Int. Cl.³ .......................... B62D 5/10; F16H 39/48
[52] U.S. Cl. .................................... 180/153; 60/426; 60/484; 180/152
[58] Field of Search ............... 180/141, 152, 153, 139; 60/425, 426, 484

[56] References Cited

U.S. PATENT DOCUMENTS

| | | | |
|---|---|---|---|
| 3,249,174 | 5/1966 | Orwig | 180/153 |
| 3,554,089 | 4/1969 | Lang | 180/153 |
| 3,584,537 | 6/1971 | Schulz | 180/152 |
| 3,765,181 | 10/1973 | Lang et al. | 180/153 |

Primary Examiner—Joseph F. Peters, Jr.
Assistant Examiner—Donn McGiehan

[57] ABSTRACT

A steering system includes load-responsive valving which automatically routes pressure fluid to one of a pair of double-acting hydraulic actuators when steering resistance is low and which automatically routes pressure fluid to both of the actuators when the steering resistance is high.

3 Claims, 3 Drawing Figures

LOAD-RESPONSIVE STEERING CONTROL VALVE

BACKGROUND OF THE INVENTION

The present invention relates to hydraulic power steering systems and more particularly relates to control valves for such systems.

Steering systems are known wherein a pair of double-acting hydraulic actuators are provided for steering a pair of wheels which are linked together such that steering movement of either wheel will be transferred to the other. Heretofore, these systems have normally been provided with controls for simultaneously effecting pressure-extension of one actuator and pressure-retraction of the other during steering operations. In these systems, the actuators are sized to develop the necessary torque to overcome the maximum steering resistance expected to be encountered, such as when operating in mud or ruts or when operating on a hillside, while the pump is sized to produce the flow necessary for effecting a relatively fast steering motion as when operating under normal conditions on even, dry terrain or on a road where steering resistance is low.

It will be appreciated, then, that these known systems are somewhat inefficient since the actuators have far too much torque-developing capacity for the times when the steering resistance is normal while the pump has far too much flow capacity for the times when the steering resistance is heavy. Thus, the system design is somewhat lacking in efficiency.

U.S. Pat. No. 3,249,174, issued on May 3, 1966, discloses a steering system wherein it is recognized that for a steering pump of a given size, the steering speed may be increased by routing the working fluid to only one of the pair of hydraulic steering actuators. This patented system thus may be designed to be more efficient than the known steering systems described hereinabove. However, the patented system has the drawback that the skill of the operator is relied upon since the operator must manually actuate a valve for routing pressure fluid to only one actuator when it is desired to speed up the steering response. While steering resistance is not mentioned in the patent, it is observed that unless a single one of the actuators has sufficient torque-developing capacity to effect steering motion when the steering resistance is high, the steering motion might stall if the operator diverts pressure fluid to only one actuator when the steering resistance is high.

SUMMARY OF THE INVENTION

According to the present invention, there is provided an improved steering system utilizing a pair of extensible and retractable hydraulic steering actuators connected for steering a pair of wheels, and more specifically, there is provided an improved control for either simultaneously actuating both actuators or for actuating only one of the actuators.

An object of the invention is to provide an efficiently designed hydraulic power steering system of the type embodying a pair of extensible and retractable hydraulic actuators and controls for effecting simultaneous pressure-operation of both actuators when high steering resistance exists and for effecting pressure-operation of only one of the actuators when low steering resistance exists.

A more specific object of the invention is to provide a steering system, as set forth in the previous object, wherein the controls include a load-responsive valve which operates to automatically connect fluid pressure to both steering actuators when the steering resistance exceeds a predetermined minimum value.

Another object of the invention is to provide a load-responsive valve, as set forth in the preceding object, having a pair of pressure-shiftable valve elements connected so as to be responsive to the pressure in the head-ends of the pair of actuators with the head-end pressure of one actuator being indicative of the steering resistance encountered during turning in one direction and the head-end pressure of the other actuator being indicative of the steering resistance encountered during turning in the other direction.

These and other objects will become apparent from a reading of the following description, together with the appended drawings.

DESCRIPTION OF THE PREFERRED EMBODIMENT

Figure 1:
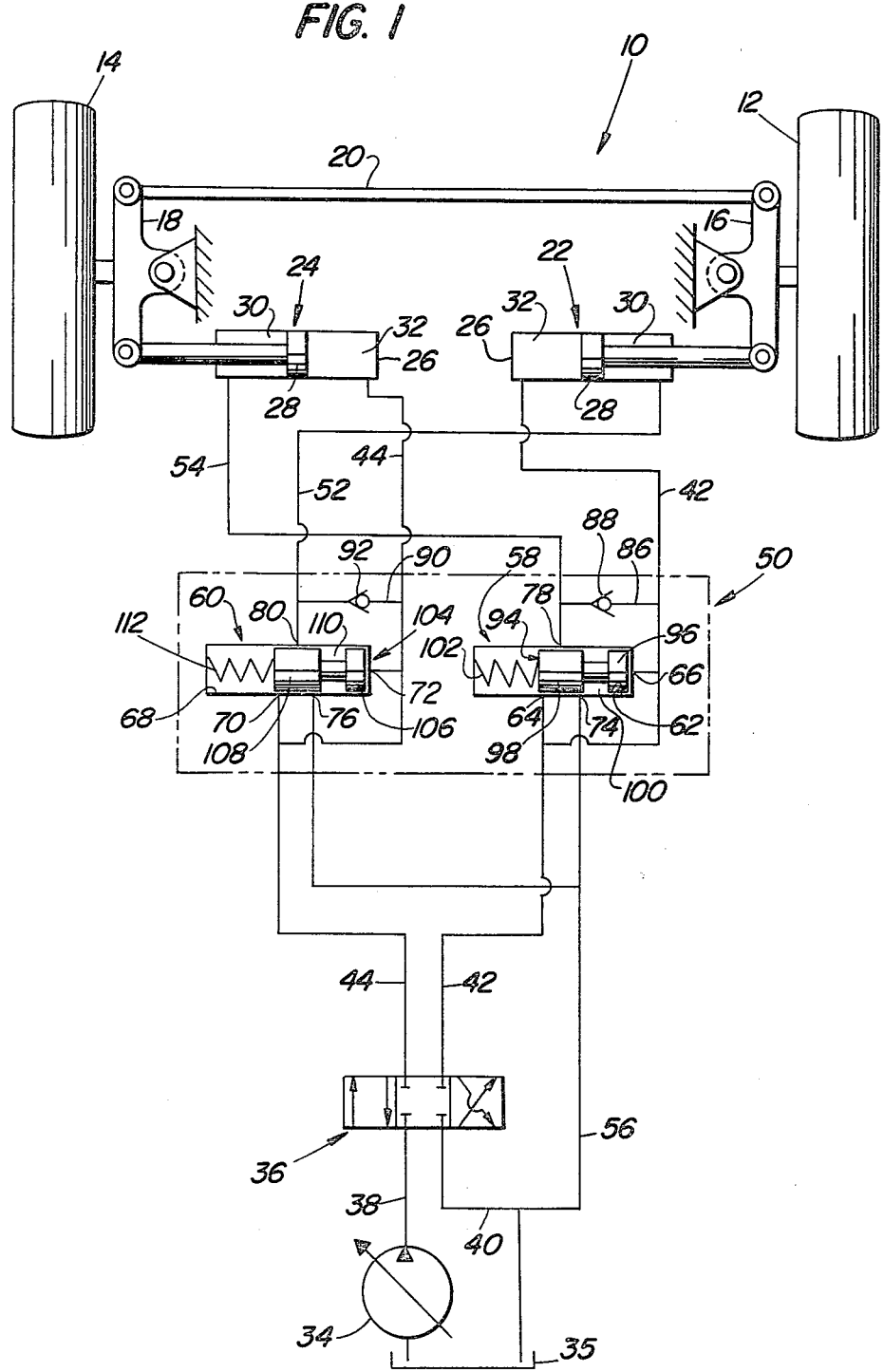
FIG. 1 is a schematic representation of a steering system constructed in accordance with the present invention with the valving being illustrated in a neutral condition and with the wheels oriented for traveling straight ahead.

Referring now to the drawings, therein is shown a hydraulic power steering system indicated in its entirety by the reference numeral 10. The system 10 includes right- and left-hand wheels 12 and 14, respectively, mounted for steering operation through means of right- and left-hand pivotally mounted steering arms 16 and 18, respectively. The arms 16 and 18 and, hence, the wheels 12 and 14 are shown positioned for effecting straight ahead movement of an associated vehicle. The arms 16 and 18 are in the form of bell cranks and have respective forward ends interconnected by a motion transfer link 20 and have respective rearward ends respectively connected to the rod ends of right- and left-hand extensible and retractable hydraulic actuators 22 and 24, respectively. Each of the actuators includes a cylinder 26 in which is located a piston 28 which divides the interior of the cylinder into a rod-end chamber 30 and a head-end chamber 32.

Pressure fluid for operating the actuators 22 and 24 is provided by a variable displacement steering pump 34 which is connected to a fluid supply held in a sump 35. A manually operable steering control valve 36 is connected to the output of the pump 34 by a supply conduit 38 and is connected to the sump 35 by a return conduit 40. A first supply-return conduit 42 is connected between the valve 36 and the head-end chamber 32 of the right-hand actuator 22 and a second supply-return conduit 44 is similarly connected between the valve 36 and the head-end chamber 32 of the left-hand actuator 24.

The conduits 42 and 44 are also connected to a load regulating valve 50. Additionally, the valve 50 is connected to the rod-end chambers 30 of the actuators 22 and 24 by supply-return conduits 52 and 54, respectively; and the valve 50 is connected to the sump 35 by a branch 56 of the return conduit 40. In a manner described in more detail below, the valve 50 operates, during normal steering operation, when steering resistance is low, to route pressure fluid to only one of the steering actuators 22 and 24 and operates during heavy steering operation, when steering resistance is high, to route pressure fluid to both of the steering actuators 22 and 24.

Specifically, the load regulating valve 50 includes indentical right- and left-hand valve sections 58 and 60, respectively. The valve section 58 includes a valve bore 62 having an inlet port 64, at one side, and a pilot port 66, at its right-hand end, connected to the supply-return conduit 42. Similarly, the valve section 60 includes a valve bore 68 having an inlet port 70, at one side, and a pilot port 72, at its right-hand end, connected to the supply-return conduit 44. Spaced rightwardly from the inlet pot 64 of the valve section 58 is a return port 74 and spaced rightwardly of the inlet port 70 of the valve section 60 is a return port 76. The return ports 74 and 76 are connected to the sump 35 by the branch 56 of the return line 40. Located on the opposite side of the bore 62 of the valve section 58 is an outlet port 78 and similarly located on the opposite side of the bore 68 of the valve section 60 is an outlet port 80. The supply-return conduit 54 connects the outlet port 78 to the rod-end chamber 30 of the left-hand actuator 24 and similarly, the supply-return conduit 52 connects the outlet port 80 to the rod-end chamber 30 of the right-hand actuator 22. Connected between the supply-return conduits 42 and 54 is a bypass line 86 containing a check valve 88 arranged for permitting fluid to flow only from the conduit 54 to the conduit 42. Similarly, connected between the supply-return conduits 44 and 52 is a bypass line 90 containing a check valve 92 for permitting fluid to flow only from the conduit 52 to the conduit 44.

Located in the bore 62 of the valve section 58 for controlling the flow of fluid between the port 78 and the ports 64 and 74 is a valve spool 94 having right- and left-hand lands 96 and 98, respectively, separated by a recess 100. Acting between the left-hand end of the bore 62 and the left-hand end of the spool 94 is a regulating spring 102 which normally holds the spool 94 against the right-hand end of the bore 62. In this position, the land 98 is disposed in blocking relationship to each of the ports 64, 74, and 78. Similarly, located in the bore 68 of the valve section 60 for controlling the flow of fluid between the port 80 and the ports 70 and 76 is a valve spool 104 having right- and left-hand lands 106 and 108, respectively, separated by a recess 110. Acting between the left-hand end of the bore 68 and the right-hand end of the spool 104 is a regulating spring 112 which normally holds the spool against the right-hand end of the bore 68. In this position, the land 108 is located in blocking relationship to each of the ports 70, 76, and 80.

Figure 2:
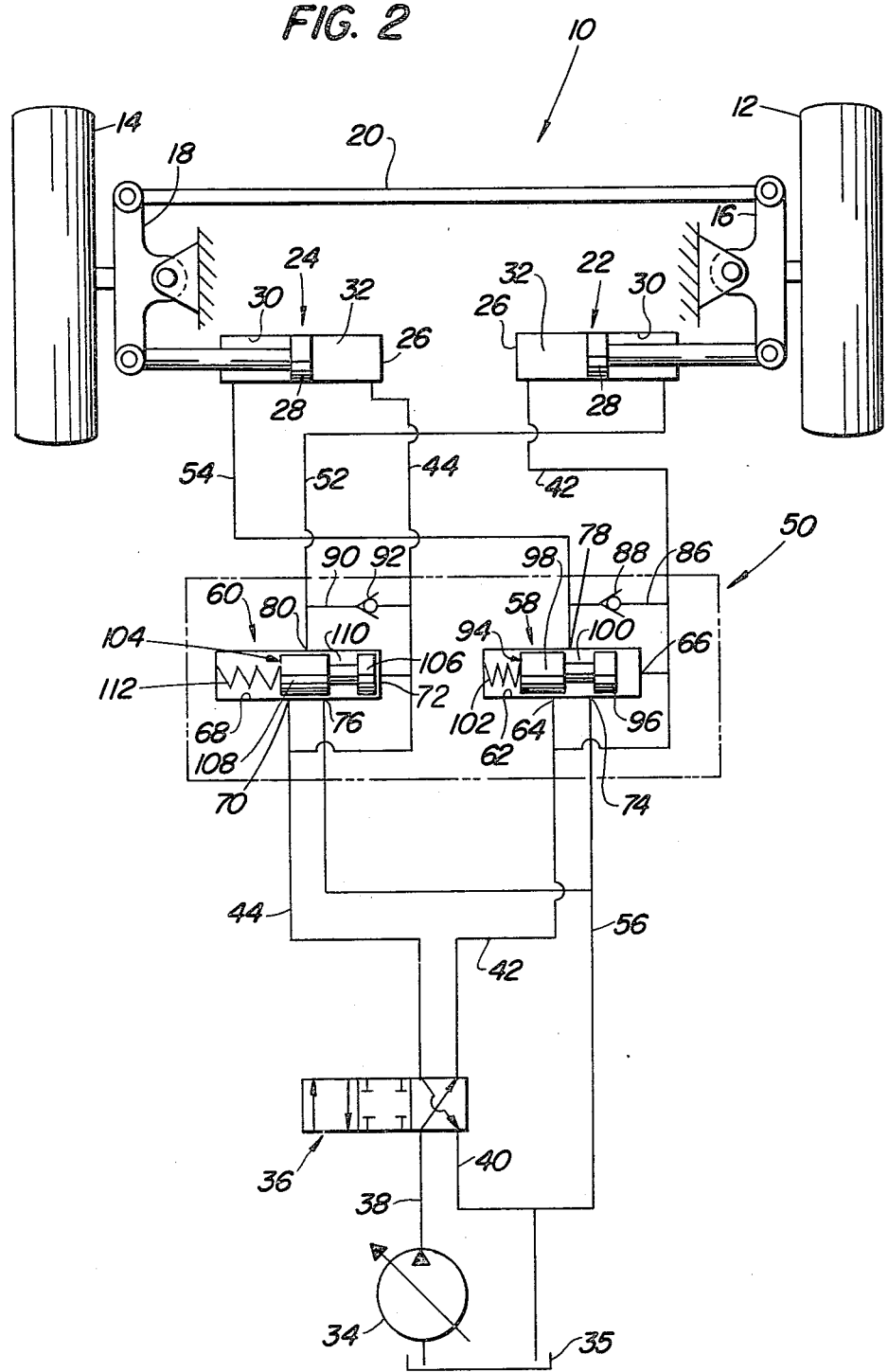
FIG. 2 is a view similar to FIG. 1 but with the valving being illustrated in a condition for effecting a left turn when the steering resistance is low.

The operation of the load regulating valve 50 is as follows. Assuming that the wheels 12 and 14 are in a straight ahead position and that the steering valve 36 is in a centered neutral position, as illustrated in FIG. 1, the vehicle will proceed along a straight path. A left-hand turn may then be accomplished by effecting left-hand movement of the valve 36 from its neutral position to a left-steer position, as shown in FIG. 2, wherein it connects the conduit 42 to the pump 34 while connecting the conduit 44 to the sump 35. Pressure fluid in the conduit 42 will then be routed to the head-end chamber 32 of the right-hand actuator 22 while the head-end chamber 32 of the left-hand actuator 24 is connected to the sump 35 by way of the conduit 44. If the steering conditions are normal, that is to say, the steering resistance is low, the pilot pressure acting on the right-hand end of the spool 94 will shift the latter leftwardly far enough to uncover and establish a flow path between the return port 74 and the outlet port 78 while keeping the inlet port 64 blocked. Under these conditions, the pressure in the head-end of the actuator 22 will extend the latter so as to turn the right wheel 12 leftwardly, the movement of the actuator 22 being transferred to the rod of the actuator 24 by way of the steering arm 16, transfer link 20 and steering arm 18 so as to cause the actuator 24 to contract with the piston 28 thereof acting to force fluid from the head-end chamber into the supply-return conduit 44 while drawing fluid into the rod end chamber by way of the branch 56 of the drain conduit 40 and the supply-return conduit 54. The pressure-extension of the right-hand actuator 22 results in fluid being forced from the rod-end chamber, of the actuator 22 into the supply-return conduit 52 from where it passes to the supply-return conduit 44 by way of the bypass line 90 and check valve 92.

Figure 3:
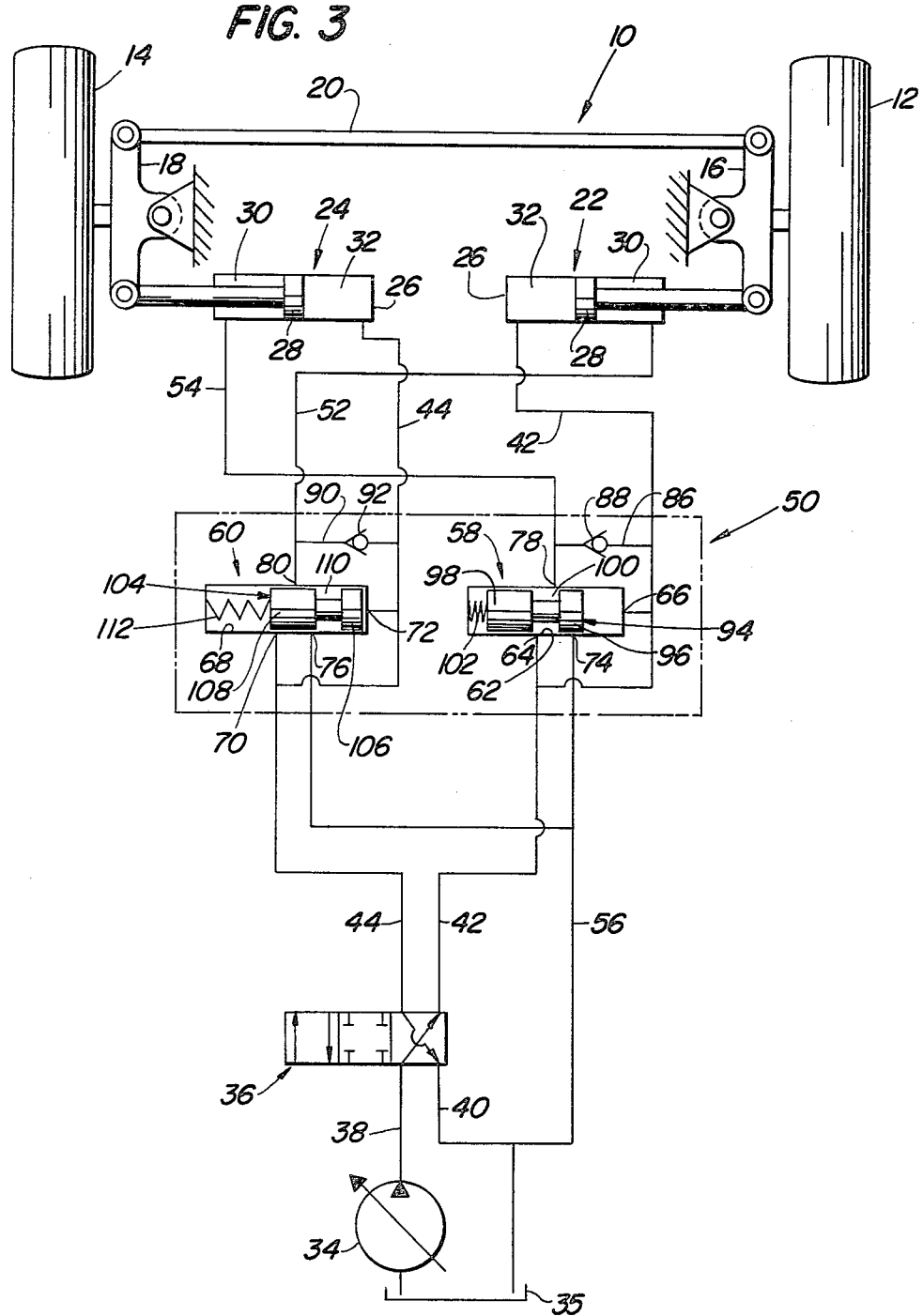
FIG. 3 is a view similar to FIG. 2, but with the valving being illustrated in the condition it assumes when the steering resistance is high.

If steering conditions are heavy, i.e., the resistance to steering is high, when the steering valve 36 is actuated, as described above, for effecting a left-hand turn, the pressure acting on the right-hand end of the valve spool 94 will be sufficient to shift the spool 94 to its heavy steering position, shown in FIG. 3, wherein the land 96 is in blocking relationship to the sump port 74 while the land 98 is positioned so as to establish a flow path between the inlet and outlet ports 64 and 78 so that pressure fluid is conveyed to the rod-end chamber 30 of the left-hand actuator 24. In the same manner as described above, the fluid exhausted from the rod-end chamber of the actuator 22 and the fluid exhausted from the head-end chamber of the actuator 24 is conveyed to the sump by way of the supply-return conduit 44.

The operation of the valve 50 for making a right-hand turn is similar to that described above for making a left-hand turn. Specifically, the valve 36 is shifted rightwardly from its centered position in FIG. 1 to a right-steer position wherein the pump 34 is connected to the head-end of the left-hand actuator 24 while the head-end of the right-hand actuator is connected to the sump 35 by the supply-return conduit 42. The valve section 58 remains in its normal position while the left-hand valve section 60 is shifted leftwardly, in accordance with the pressure existing in supply-return conduit 44, so as to establish a fluid path for permitting fluid to be drawn from the sump 35 into the rod-end of the right-hand actuator 22 under normal steering conditions when the resistance to steering movement of the wheels is low and so as to establish a fluid path for permitting pressure fluid to be routed to the rod-end of the actuator 22 under heavy steering conditions when the resistance to steering movement of the wheels is high.

I claim:

1. A power steering system, comprising: a source of fluid pressure; a sump; first and second extensible and retractable hydraulic actuators; a manually operable main steering control valve; a supply conduit connected between the source and the valve, a drain conduit connected between the valve and the sump; first and second supply return lines respectively connected between the valve and respective first ends of the actuators, said valve being shiftable from a neutral position, wherein it blocks flow to and from the actuators, to a left-steer position wherein it connects the source to the first end of the first actuator while connecting a first end of the second actuator to the sump, and to a right-steer position wherein it connects the source to the first end of the second actuator while connecting the first end of the first actuator to the sump; a load-responsive valve means; said first and second supply-return conduits being connected to said load-responsive valve means; third and fourth supply-return conduits connected between the load-responsive valve means and the respective second ends of the first and second actuators; said drain conduit being connected to the load-responsive valve means; said load-responsive valve means including a first one-way valve connected to permit flow from the third supply-return conduit to the second supply-return conduit and a second one-way valve connected to permit flow from the fourth supply-return conduit to the first supply-return conduit; said load-responsive valve means including a pressure shiftable element means connected for sensing the pressure existing in the first ends of the actuators and operating, when the main steering control valve is in its right-steer position and the pressure in the first supply-return conduit is below and above a predetermined value, to respectively connect the fourth supply-return conduit to the drain conduit and to the first supply-return conduit and operating when the main steering control valve is in its left-steer position and the pressure in the second supply-return conduit is below and above the predetermined value, to respectively connect the third supply-return conduit to the drain conduit and to the second supply-return conduit.

2. The steering system defined in claim 1 wherein the pressure-shiftable valve element means includes a first valve spool having an end connected in pressure-receiving relationship to the first supply-return conduit and a second valve spool having an end connected in pressure-receiving relationship to the second supply-return conduit and biasing means acting on the first and second valve spools to yieldably resist pressure-induced movement of the latter.

3. In a power steering system including a source of fluid pressure, a sump, a steering control valve set connected to the pump and the sump, first and second extensible and retractable hydraulic actuators connected to the valve set and the valve set being operable to effect either simultaneous power extension of one and power retraction of the other actuator, or, power extension or retraction of just one of the actuators, the improvement wherein said valve set includes a main control valve which is selectively operable for connecting fluid pressure to a first end of the first actuator while connecting the first end of the second actuator to sump and vice-versa; first and second one-way fluid passage means respectively connecting a second end of the first actuator to the first end of the second actuator, and connecting a second end of the second actuator to the first end of the first actuator; and a load-responsive valve means connected to sense the pressure in the first ends of the actuators and responsive to pressures below a predetermined pressure in the first ends of the actuators to connect to sump the second end of that one of the actuators having its first end connected to the sump by the main control valve, and the load-responsive valve means being responsive to a pressure above the predetermined pressure to connect to the source of fluid pressure the second end of that one of the actuators having its first end connected to the sump by the main control valve.

* * * * *